United States Patent
Riedrich et al.

[15] 3,651,698
[45] Mar. 28, 1972

[54] INDEXIBLE TOOL TURRET

[72] Inventors: Alfred Riedrich, Bielefeld; Werner Latten, Theesen Kreis, Bielefeld, both of Germany

[73] Assignee: Werkzeugmaschinenfabrik Gildemeister & Company AG, Bielefeld, Germany

[22] Filed: June 19, 1970

[21] Appl. No.: 47,804

[30] Foreign Application Priority Data

June 21, 1969 Germany..................P 19 31 592.5

[52] U.S. Cl..................................74/818, 74/824, 74/826, 82/36 A
[51] Int. Cl..........................................B23b 29/32
[58] Field of Search........................74/826, 813 R, 818, 824; 82/36 A; 90/56

[56] References Cited

UNITED STATES PATENTS

| 2,975,657 | 3/1961 | Samuel | 74/826 X |
| 3,242,771 | 3/1966 | Maier et al. | 74/826 |
| 3,118,347 | 1/1964 | Thompson | 74/826 X |
| 2,952,169 | 9/1960 | Johnson | 74/826 X |

Primary Examiner—Milton Kaufman
Assistant Examiner—F. D. Shoemaker
Attorney—Michael S. Striker

[57] ABSTRACT

A machine tool wherein the tool turret is indexible about a shaft and is shiftable axially to move the teeth of a ring gear thereon into and out of mesh with the teeth of a stationary ring gear. The indexing mechanism for the tool turret has a pinion which is coaxial with the turret and can be connected thereto by means of a disengageable clutch. The pinion is in permanent mesh with a reciprocable fluid-operated rack. When the clutch is engaged and the ring gears are disconnected, the rack can index the turret by way of the pinion and clutch. When the clutch is disengaged, the rack can return to its starting position without indexing of the turret because the pinion is free to rotate with reference to the turret.

5 Claims, 6 Drawing Figures

Inventors:
ALFRED RIEDRICH
WERNER LATTEN
BY Michael S. Strikes
their ATTORNEY

Inventors:
ALFRED RIEDRICH
WERNER LATTEN

INDEXIBLE TOOL TURRET

BACKGROUND OF THE INVENTION

The present invention relates to machine tools or the like in general, and more particularly to improvements in indexing mechanisms for tool turrets or other types of indexible members in automatic machine tools. Still more particularly, the invention relates to improvements in indexing mechanisms of the type wherein the indexible member receives torque from a pinion which is rotatable by a toothed rack, preferably by a rack which is reciprocable by one or more hydraulic or pneumatic cylinders.

It is already known to mount the tool turret in an automatic machine tool for axial movement between an upper and a lower position. The pinion of the indexing mechanism is connected with the turret and meshes with a rack when the turret is raised. When the turret descends, the pinion is disengaged from the rack (so that the latter can return to its starting position) and a gear on the turret moves into mesh with a stationary gear to lock the turret in the freshly selected angular position. A drawback of such indexing mechanisms is that the turret must be lifted and lowered two or more times whenever the extent of the desired angular movement is such that it necessitates repeated return movement of the rack to its starting position. Repeated lifting and lowering of the turret consumes much time, especially in machine tools which employ large turrets for a substantial number of tools; such turrets must be moved at a low speed and, therefore, each indexing operation reduces the output of the machine.

It is also known to employ in a programmed automatic machine a tool turret which is indexible about a vertical axis and carries at its underside a ring gear in permanent mesh with a second ring gear. The latter can be locked to or unlocked from its support so that the turret can be indexed without lifting as soon as the second ring gear is unlocked. A drawback of such machines is that the turret cannot be located in different angular positions with requisite accuracy, especially if the second ring gear is mounted on its support with at least some freedom of radial movement and/or if the second ring gear is locked to its support without appreciable play. Moreover, the mechanism which locks or unlocks the second ring gear is rather bulky and expensive.

SUMMARY OF THE INVENTION

An object of the invention is to provide a novel and improved indexing mechanism for tool turrets or analogous indexible members which can be utilized in automatic machine tools, particularly in machines wherein all operations are carried out in accordance with a predetermined program.

Another object of the invention is to provide an indexing mechanism which can index the tool turret through any desired angle with little loss in time and without necessitating repeated lifting and lowering of the turret.

A further object of the invention is to provide an indexing mechanism which permits locking of the turret or an analogous indexible member in each of a desired number of different angular positions, with a high degree of accuracy, and by resorting to a relatively simple, rugged and compact locking structure.

An additional object of the invention is to provide an improved indexing mechanism of the type wherein the input member is a reciprocable rack which can index a turret or the like by way of a pinion.

The invention is embodied in a machine tool or the like, particularly in a fully programmed automatic machine which comprises a tool turret or an analogous indexible member which is rotatable about a predetermined axis between two or more angular positions, a novel indexing means for the indexible member. The indexing means includes a pinion or an analogous rotary member which is coaxial with the indexible member, a fluid-operated reciprocable toothed rack or analogous means for rotating the rotary member between a desired number of angular positions, clutch means between the rotary member and the indexible member, and means for engaging and disengaging the clutch means so that the indexible member is caused to change its angular position in response to rotation of the rotary member when the clutch means is engaged to connect the indexible member with the rotary member and that the rotary member can rotate independently of the indexible member when the clutch means is disengaged. The rack is then free to return to its starting position while the indexible member need not change its axial position.

The novel features which are considered as characteristic of the invention are set forth in particular in the appended claims. The improved indexing mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
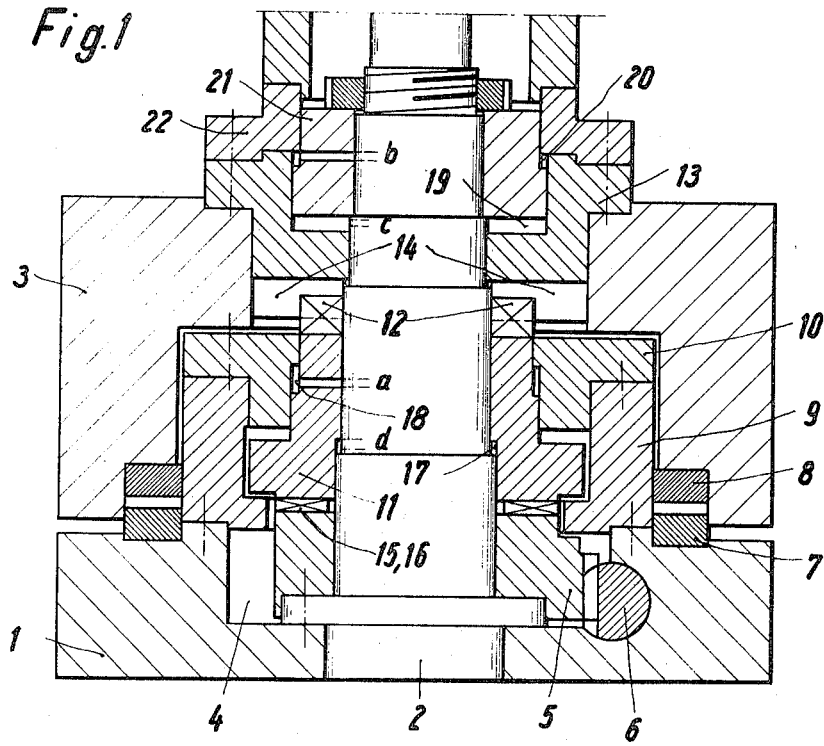
FIG. 1 is a fragmentary axial sectional view of a machine tool including an indexing mechanism which embodies one form of the invention.

Referring first to FIG. 1, there is shown a portion of a machine tool which comprises a support or base 1 for an upright centering member or shaft 2 which is surrounded by an annular tool turret 3. The holder or holders for one or more tools on the turret 3 are of conventional design and are not shown in the drawing. The turret 3 is indexible about the axis of the shaft 2 and is movable, within limits, axially up and down.

The support 1 is provided with a circular recess 4 which accommodates a pinion 5 here shown as a gear segment which is rotatable about the axis of the shaft 2 and is in permanent mesh with a toothed rack 6. The latter is reciprocable by a hydraulic or pneumatic cylinder and piston arrangement, not shown. The pinion 5 and rack 6 form part of the means for indexing the tool turret 3 when the latter is lifted sufficiently to become disconnected from the support 1. This support is fixedly connected with a ring gear 7 whose teeth extend upwardly and normally mesh with the downwardly extending teeth of a second ring gear 8 which is rigid or integral with the turret 3. When the teeth of the ring gears 7, 8 mesh with each other, the turret 3 is locked in one of several predetermined angular positions. The ring gears 7, 8 constitute portions of a simple locking device for the tool turret 3.

In the embodiment of FIG. 1, the support 1 is rigidly connected with a sleeve 9 which is surrounded by the ring gears 7 and 8. The sleeve 9 is rigid or integral with a flange 10 which surrounds an axially movable cylindrical clutch element 11 which is rotatable about the shaft 2. The upper end face of the clutch element 11 is provided with projections or teeth 12 extending into tooth spaces 14 provided in a collar 13 which is connected with the tool turret 3. The collar 13 and the teeth 12 establish a permanent torque-transmitting connection between the clutch element 11 and the tool turret 3. The lower end face of the clutch element 11 is formed with claws or teeth 15 which normally engage with claws or teeth 16 extending upwardly from the top face of the pinion 5. Thus, when the claws 15 engage with the claws 16 and the rack 6 is moved lengthwise, the clutch element 11 receives torque from the pinion 5.

The clutch element 11 has an internal annular shoulder which defines with an external annular shoulder of the shaft 2 a first cylinder chamber 17; this chamber can receive or discharge a suitable hydraulic pressure medium (e.g., oil) by way of one or more bores $d$ in the shaft 2. When the illustrated bore $d$ admits pressurized liquid to the chamber 17, the clutch element 11 is caused to move upwardly and to disengage its claws 15 from the claws 16 of the pinion 5 so that the latter is free to rotate independently of the tool turret 3.

The flange 10 of the sleeve 9 has an internal annular shoulder which defines with an external annular shoulder of the clutch element 11 a second ring-shaped cylinder chamber 18. The chamber 18 can receive or discharge a hydraulic pressure medium by way of one or more bores $a$ in the shaft 2. When the illustrated bore $a$ admits a pressurized liquid to the chamber 18, the clutch element 11 is caused to move downwardly and to place its claws 15 into engagement with the claws of the pinion 5. Thus, the liquid which is admitted to the chamber 17 or 18 serves to move the clutch element 11 up or down in order to respectively disengage or engage the clutch including the claws 15 and 16 and to thus respectively permit and prevent rotation of the pinion 5 with reference to the tool turret 3.

A third annular cylinder chamber 19 is provided between an internal annular shoulder of the collar 13 and a ring 21 which is fixed to the shaft 2. When the chamber 19 receives a pressurized liquid by way of the illustrated bore $c$ in the shaft 2, the collar 13 is caused to move downwardly and to move the teeth of the ring gear 8 on the tool turret 3 into mesh with the teeth on the ring gear 7 of the support 1. A fourth cylinder chamber 20 is provided between a ring 22 which is bolted to the collar 13 and an external annular shoulder of the aforementioned ring 21. When the chamber 20 receives a pressurized liquid by way of the bore $b$ in the shaft 2, the collar 13 is caused to move axially upwardly and to lift the gear 8 of the tool turret 3 above and away from the gear 7 on the support 1, i.e., to disengage the turret from the support 1.

Figure 2:
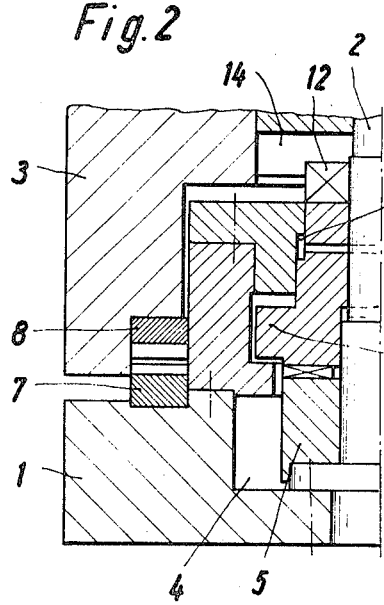
FIG. 2 illustrates a portion of the structure shown in FIG. 1 but with the turret disconnected from the support.

In order to change the angular position of the tool turret 3, the programming system of the machine tool admits pressurized liquid into the cylinder chambers 18 and 20 by way of the bores $a$ and $b$ so that the descending clutch element 11 engages its claws 15 with the claws 16 of the pinion 5 and that the ascending tool turret 3 raises its ring gear 8 above and away from the ring gear 7 on the support 1. At the same time, the bores $c$ and $d$ are permitted to discharge liquid flowing from the cylinder chambers 19 and 17. The rack 6 is then moved lengthwise (forwardly or rearwardly) to turn the pinion 5 and to index the tool turret by way of the claws 16, 15, clutch element 11, its projections 12 and collar 13. The raised position of the tool turret 3 and the lowered position of the clutch element 11 are shown in FIG. 2.

Figure 3:
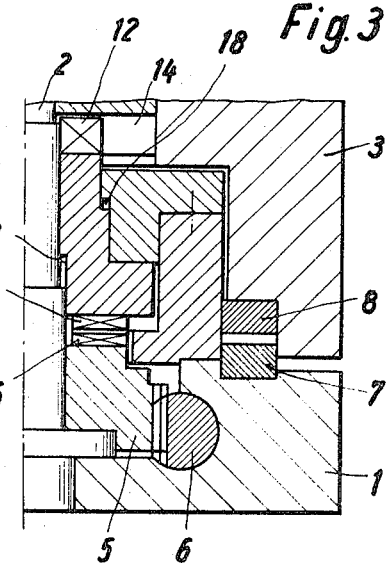
FIG. 3 illustrates a portion of the structure shown in FIG. 1 but with the clutch in disengaged position.

In order to thereupon locate the indexed tool turret 3 with a requisite degree of accuracy and to lock the turret in the newly selected angular position, the bores $a$ and $b$ are permitted to discharge liquid from the cylinder chambers 18 ad 20. The bores $c$ and $d$ admit pressurized liquid to the cylinder chambers 19 and 17 whereby the tool turret descends to place the teeth of the ring gear 8 into mesh with the teeth of the ring gear 7, and the clutch element 11 rises to disengage its claws 16 from the claws 15 of the pinion 5. This is shown in FIG. 3. The tool turret 3 is then locked to the support 1 and the pinion 5 is free to turn in response to lengthwise movement of the rack 6 back to its starting position. In the next step, the programming system admits pressurized liquid to the cylinder chamber 18 by way of the bore $a$ so that the clutch element 11 descends and moves its claws 15 into engagement with the claws 16. The indexing mechanism is then ready to change the angular position of the tool turret 3 as soon as the ring gear 8 is lifted above and away from the ring gear 7 so that the rack 6 can leave its starting position.

Figure 4:
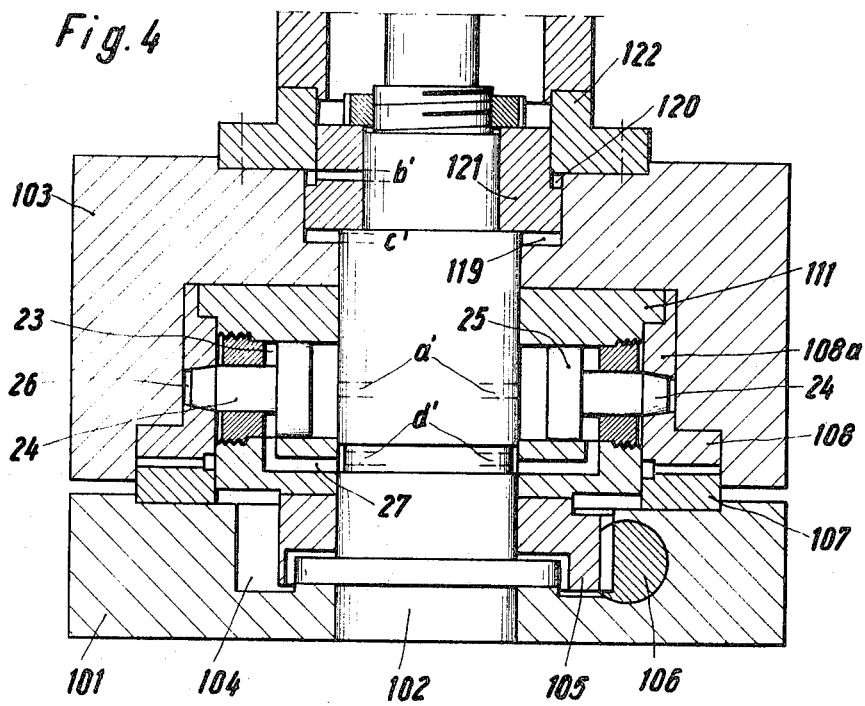
FIG. 4 is a fragmentary axial sectional view of a machine tool including an indexing mechanism which embodies another form of the invention.
Figure 5:
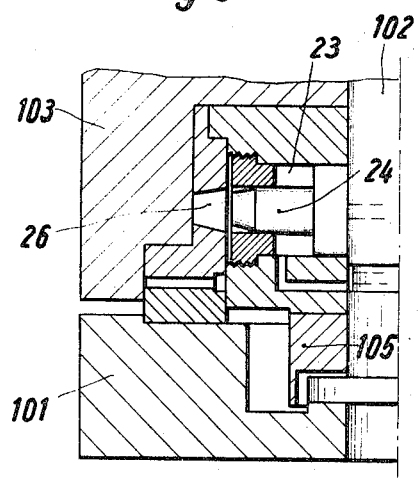
FIG. 5 illustrates a portion of the structure shown in FIG. 4 but with the clutch disengaged.
Figure 6:
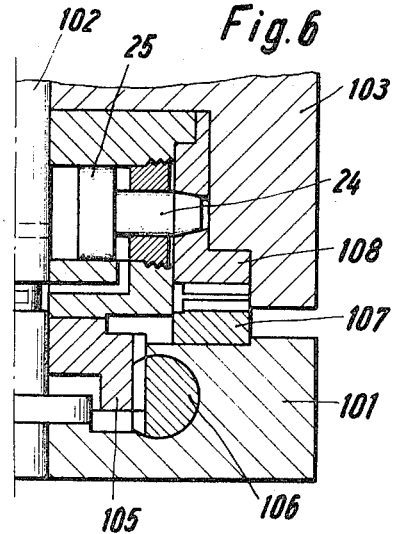
FIG. 6 illustrates a portion of the structure shown in FIG. 4 but with the tool turret disconnected from its support.

FIGS. 4 to 6 illustrate a portion of a second machine tool wherein the pinion 105 is rigidly connected with a clutch element 111 which surrounds the centering shaft 102 and is received in an internal compartment of the tool turret 103. The clutch element 111 is formed with several radially extending double-acting cylinders 23 for pistons 25 which are provided with radially outwardly extending conical clutch pins 24. The ring gear 108 on the tool turret 103 has a cylindrical extension 108a which is provided with conical sockets 26 in registry with the coupling pins 24.

The shaft 102 is formed with bores $d'$ which can admit pressurized liquid to the outer chambers of the cylinders 23 by way of channels 27 machined into the clutch element 111. The bores $a'$ of the shaft 102 can admit pressurized liquid to the inner chambers of the cylinders 23. The bores $b'$ and $c'$ respectively serve to admit pressurized liquid to the cylinder chambers 120, 119. The chamber 119 is defined by the tool turret 103 and a ring 121 on the shaft 102. The chamber 120 is defined by the ring 121 and a ring 122 fixed to the tool turret 103. The numerals 101, 104, 107 and 106 respectively denote the support, its recess, its ring gear and the rack.

In order to change the angular position of the tool turret 103, the programming system of the machine tool connects the bore $c'$ and cylinder chamber 119 to the sump and admits pressurized liquid to the chamber 120 by way of the bore $b'$. This causes the tool turret 103 to move upwardly and to raise its ring gear 108 above and away from the ring gear 107. The bores $a'$ admit pressurized liquid to the inner chambers of the cylinders 23 so that the clutch pins 24 of the pistons 25 extend into the respective sockets 26 and couple the clutch element 111 to the tool turret 103. At the same time, the bores $d'$ permit liquid to escape from the outer chambers of the cylinders 23 by way of the channels 27. This is shown in FIG. 6. The tool turret 103 is indexed in response to lengthwise movement of the rack 106 which rotates the pinion 105 whereby the pinion rotates the tool turret by way of the clutch element 111, clutch pins 24 and ring gear 108.

In order to thereupon locate the tool turret 103 in an accurately determined angular position and to lock it to the support 101, the programming system admits pressurized liquid into the cylinder chamber 119 by way of the bore $c'$ and the bore $b'$ is connected to the sump. This causes the tool turret 103 to descend and to engage the teeth of the ring gear 108 with the teeth of the ring gear 107. The rack 106 can return to its starting position subsequent to admission of pressurized liquid into the outer chambers of the cylinders 23 (by way of the bores $d'$ and channels 27) while the bores $a'$ discharge spent liquid into the sump. The clutch pins 24 are retracted from the respective sockets 26 so that the pinion 105 and the clutch element 111 can rotate with reference to the tool turret 103 while the rack 106 returns to its starting position. This is shown in FIG. 5. It will be seen that the sockets 26 and the clutch pins 24 form part of a disengageable clutch which is analogous to the clutch including the claws 15, 16 of FIGS. 1–3 because it is also interposed between the pinion and the tool turret.

An important advantage of the improved indexing mechanism is that the axial position of the turret 3 or 103 need not change when the extent of desired indexing movement is such that the rack 6 or 106 must repeatedly return to its starting position. Thus, and referring again to FIG. 2, the clutch element 11 can be moved into and from torque-receiving engagement with the pinion 5 while the turret 3 remains in the raised position. The weight of the clutch element 11 is rather negligible so that it can be rapidly moved up and down while remaining in permanent torque-transmitting engagement with the tool turret 3 by way of the projections 12 and collar 13. In the embodiment of FIGS. 4 to 6, the turret 103 can remain in the raised position of FIG. 6 while the lightweight pistons 25 are repeatedly moved radially of the centering shaft 102 to establish or to terminate the torque-transmitting connection between the clutch element 111 and the tool turret. The time necessary to move the lightweight pistons 25 or the lightweight clutch element 11 is but a fraction of the time which is needed to move a heavy and bulky tool turret between its upper and lower end positions. Consequently, the indexing operation which is carried out with the mechanism of our invention consumes but a fraction of the time which is required to index a heavy turret with conventional indexing means.

It is clear that the indexing mechanism of our invention can be used to index the turret in a clockwise and/or counterclockwise direction as well as that the turret can be indexed through angles of identical magnitude or through different angles.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a machine tool or the like, a combination comprising a centering member; an indexible member coaxial with and surrounding said centering member, said indexible member being rotatable about the axis of said centering member between a plurality of angular positions; and indexing means for said indexible member, including a rotary member coaxial with said indexible member, means for rotating said rotary member, clutch means provided between said rotary member and said indexible member, and means for engaging and disengaging said clutch means so that said indexible member is caused to change its angular position in response to rotation of said rotary member when said clutch means is engaged to connect said indexible member with said rotary member and that said rotary member can rotate independently of said indexible member when said clutch means is disengaged, said clutch means comprising a clutch element rotatably surrounding said centering member and arranged to transmit torque to said indexible member, said clutch element being movable axially of said centering member and being in permanent torque-transmitting engagement with said indexible member and said means for engaging and disengaging said clutch means comprising fluid-operated means for moving said clutch element axially into and away from torque-receiving engagement with said rotary member.

2. A combination as defined in claim 1, wherein said clutch element comprises first claw means and said rotary member comprises complementary second claw means engaging with said first claw means in response to axial movement of said clutch element in one direction and being disengaged from said first claw means in response to axial movement of said clutch element in another direction.

3. In a machine tool, a combination comprising a support; an upright centering member provided on said support; an indexible tool turret coaxially surrounding and being rotatable about the axis of said centering member, with reference to said support between a plurality of angular positions, said turret being further movable within limits axially of said centering member; and indexing means for said turret, including a rotary toothed member coaxial with said turret and being rotatable on said centering member, means for rotating said toothed member including a fluid-operated toothed rack in permanent mesh with said toothed member, clutch means provided between said toothed member and said turret, and means for engaging and disengaging said clutch means so that said turret is caused to change its angular position with reference to said support when said clutch means is engaged and said rack rotates said toothed member, said toothed member being rotatable by said rack independently of said turret in each axial position of said turret with reference to said centering member when said clutch means is disengaged.

4. A combination as defined in claim 3, wherein said clutch means comprises a clutch element rotatable on said centering member above said toothed member and being movable within limits axially of said centering member, and means for permanently coupling said clutch element to said turret so that the latter shares all angular movements of said clutch element, said means for engaging and disengaging said clutch means comprising means for moving said clutch element axially of said centering member between a position of disengagement from said toothed member and a position of torque-receiving engagement with said toothed member.

5. A combination as defined in claim 3, wherein said clutch means comprises a clutch element which is in permanent torque-receiving engagement with said toothed member and said means for engaging and disengaging said clutch means comprises fluid-operated means for coupling and uncoupling said clutch element from said turret, said means for coupling and uncoupling comprising at least one piston reciprocably received in said clutch element and movable radially thereof between a position of disengagement from and a position of torque-transmitting engagement with said turret.

* * * * *